US012658180B2

(12) United States Patent
Cheng

(10) Patent No.: US 12,658,180 B2
(45) Date of Patent: Jun. 16, 2026

(54) AUDIO PLAY METHOD AND SYSTEM, AND ELECTRONIC DEVICE

(71) Applicant: Huawei Technologies Co., Ltd., Shenzhen (CN)

(72) Inventor: Li Cheng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 18/699,548

(22) PCT Filed: Oct. 20, 2022

(86) PCT No.: PCT/CN2022/126448
§ 371 (c)(1),
(2) Date: Apr. 8, 2024

(87) PCT Pub. No.: WO2023/078093
PCT Pub. Date: May 11, 2023

(65) Prior Publication Data
US 2024/0412724 A1 Dec. 12, 2024

(30) Foreign Application Priority Data
Nov. 3, 2021 (CN) .......................... 202111295354.X

(51) Int. Cl.
*G10L 15/08* (2006.01)
*G06F 3/16* (2006.01)
(Continued)

(52) U.S. Cl.
CPC ................ *G10L 15/08* (2013.01); *G06F 3/16* (2013.01); *G10L 15/30* (2013.01); *G10L 25/51* (2013.01); *G10L 2015/088* (2013.01)

(58) Field of Classification Search
CPC ......... G10L 15/04; G10L 15/08; G10L 15/22; G10L 15/30; G10L 15/26; G10L 25/51;
(Continued)

(56) References Cited

U.S. PATENT DOCUMENTS

2012/0324324 A1* 12/2012 Hwang ................... G11B 27/11
715/203
2016/0056787 A1* 2/2016 Lu ........................... H04S 7/307
381/101
2019/0204998 A1* 7/2019 Hartrell ................... G10L 15/26

FOREIGN PATENT DOCUMENTS

CN 105740356 A 7/2016
CN 106126676 A 11/2016
(Continued)

*Primary Examiner* — Leshui Zhang
(74) *Attorney, Agent, or Firm* — Slater Matsil, LLP

(57) ABSTRACT

An example method is discussed, which includes determining first audio data. The example method further includes determining a text file and metadata of the first audio data by performing content recognition processing on the first audio data. The example method further includes determining an audio type of the first audio data by performing audio type recognition processing on the first audio data based on the text file and the metadata. The example method further includes determining a sound effect mode corresponding to the audio type, where the sound effect mode is determined based on a preset correspondence between the audio type and the sound effect mode. The method further includes playing the first audio data based on the sound effect mode.

18 Claims, 7 Drawing Sheets

(51) Int. Cl.

| | | |
|---|---|---|
| *G06F 16/68* | (2019.01) | |
| *G06F 16/683* | (2019.01) | |
| *G10L 15/26* | (2006.01) | |
| *G10L 15/30* | (2013.01) | |
| *G10L 25/51* | (2013.01) | |

(58) Field of Classification Search
   CPC ..... G10L 2015/088; G06F 3/16; G06F 3/162;
                G06F 3/165; G06F 3/167; G06F 16/68;
                      G06F 16/683; G06F 16/685; G06F
                   16/686; G06F 9/453; G06F 40/30; G06Q
                                30/0269; H04N 21/4394
   USPC .......................... 704/235, 231, 239, 240, 251
   See application file for complete search history.

(56)                  References Cited

FOREIGN PATENT DOCUMENTS

| CN | 109087634 A | 12/2018 |
|---|---|---|
| CN | 113590871 A | 11/2021 |

* cited by examiner

AUDIO PLAY METHOD AND SYSTEM, AND ELECTRONIC DEVICE

CROSS-REFERENCE TO RELATED APPLICATIONS

This application is a National Stage of International Application No. PCT/CN2022/126448, filed on Oct. 20, 2022, which claims priority to Chinese Patent Application No. 202111295354.X, filed on Nov. 3, 2021. Both of the aforementioned applications are hereby incorporated by reference in their entireties.

TECHNICAL FIELD

This application relates to the field of computer technologies, and in particular, to an audio play method and system, and an electronic device.

BACKGROUND

With the development of science and technology, for example, audio play devices such as a sound box and a mobile phone usually have a plurality of sound effect modes, so that a user can select, according to a preference and a requirement of the user, different sound effect modes to play audio data. For example, the user has different sound effect mode requirements for playing two types of audio data: music (that is, a song) and an audio book (for example, a story or Pingshu). Currently, the audio play device usually plays various types of audio data by using a default music play sound effect mode. When an audio book is played, the user needs to manually change (or switch), according to a requirement by using a button or an audio play application (Application, APP), the music play sound effect mode to a sound effect mode that is more suitable for playing the audio book. In this manner, there are problems that user operations are cumbersome and user experience is affected.

SUMMARY

This application provides an audio play method and system, an electronic device, and a computer-readable storage medium, to resolve problems that user operations are cumbersome and user experience is affected when a user manually adjusts a sound effect mode. To be specific, when audio data is played, a sound effect mode corresponding to the audio data can be more conveniently and accurately determined automatically, and sound effect mode adjustment is performed. In this way, accuracy of audio mode adjustment can be improved, and audio data play effect can be enhanced, thereby improving user experience. Especially, when an audio book needs to be played, a default music play sound effect mode can be more conveniently and accurately changed automatically, for example, to a sound effect mode that is more suitable for playing the audio book. In this way, audio book play effect can be improved, thereby improving user experience.

To resolve the foregoing technical problems, according to a first aspect, an implementation of this application provides an audio play method applied to a first electronic device. The method includes: determining first audio data for playing; performing content recognition processing on the first audio data, to determine a text file and metadata of the first audio data; performing audio type recognition processing on the first audio data based on the text file and the metadata, to determine an audio type of the first audio data; determining, based on the audio type and a preset correspondence between an audio type and a sound effect mode, a sound effect mode corresponding to the audio type; and playing the first audio data based on the sound effect mode.

In this way, by performing processing such as the content recognition processing and the audio type recognition processing on the first audio data, the first electronic device can more conveniently and accurately determine automatically the sound effect mode corresponding to the to-be-played audio data, and perform sound effect mode adjustment. In this way, accuracy of audio mode adjustment can be improved, and audio data play effect can be enhanced, thereby improving user experience. Therefore, problems that user operations are cumbersome and user experience is affected when the user manually adjusts a sound effect mode are avoided. In addition, especially when an audio book needs to be played, for example, the first electronic device can more conveniently and accurately change a default music play sound effect mode automatically to a sound effect mode that is more suitable for playing the audio book. In this way, audio book play effect can be improved, thereby improving user experience.

In addition, the first electronic device performs the audio type recognition processing on the first audio data based on the text file and the metadata, to determine the audio type of the first audio data. In this way, accuracy of audio mode adjustment can be improved, and audio data play effect can be enhanced, thereby improving user experience.

In a possible implementation of the first aspect, the content recognition processing includes automatic speech recognition processing, and the performing content recognition processing on the first audio data, to determine a text file of the first audio data includes: performing the automatic speech recognition processing on the first audio data within a preset time period, to obtain text content corresponding to speech content of the first audio data and use the text content as the text file.

Through the automatic speech recognition processing, the text content corresponding to the first audio data can be conveniently obtained and used as the text file. Text content of audio data usually includes a lot of content that can identify an audio data type. For example, a song includes lyrics, and an audio book includes information such as a title. Therefore, audio type recognition is performed based on the text content, so that accuracy of audio mode adjustment can be effectively improved.

In a possible implementation of the first aspect, the content recognition processing includes metadata recognition processing, and the performing content recognition processing on the first audio data, to determine metadata corresponding to the first audio data includes: performing the metadata recognition processing on the first audio data to obtain the metadata, where the metadata includes at least one type of the following information: title information, album information, author information, publisher information, genre information, and artist information of the first audio data.

The metadata corresponding to the first audio data can be conveniently obtained through the metadata recognition processing. Metadata of audio data usually includes the foregoing information that can identify an audio data type, such as title information, album information, author information, publisher information, genre information, artist information, and the like. Therefore, audio type recognition is performed based on the metadata, so that accuracy of audio mode adjustment can be effectively improved.

In a possible implementation of the first aspect, the performing audio type recognition processing on the first audio data based on the text file and the metadata includes: separately performing keyword matching processing on the text file and the metadata with a preset keyword in an audio book recognition database, to determine a matching keyword; determining a keyword matching degree based on the matching keyword; and determining the audio type of the first audio data based on the keyword matching degree.

In a possible implementation of the first aspect, if the keyword matching degree is greater than or equal to a preset matching degree threshold, it is determined that the audio type of the first audio data is an audio book; or if the keyword matching degree is less than a matching degree threshold, it is determined that the audio type of the first audio data is a non-audio book.

In this way, the audio type of the first audio data can be more conveniently and accurately determined through keyword matching. In addition, the audio type may be alternatively another type other than the two types: the audio book and the non-audio book, and may be selected and set according to a requirement.

In a possible implementation of the first aspect, the method further includes: performing the keyword matching processing on the text file, to obtain a first keyword matching degree; and if the first keyword matching degree is greater than or equal to the matching degree threshold, determining that the audio type of the first audio data is the audio book; or if the first keyword matching degree is less than the matching degree threshold, performing the keyword matching processing on the metadata to obtain a second keyword matching degree; and if a sum of the first keyword matching degree and the second keyword matching degree is greater than or equal to the matching degree threshold, determining that the audio type of the first audio data is the audio book; or if a sum of the first keyword matching degree and the second keyword matching degree is less than the matching degree threshold, determining that the audio type of the first audio data is the non-audio book.

The metadata of the audio data is usually configured by a publisher of the audio data. Therefore, there may be a problem of a configuration error or inaccurate configuration. Compared with the metadata, the content in the text file has fewer errors, and can more accurately identify the audio data type. Therefore, the keyword matching processing may be preferentially performed on the text file. In other words, a matching result of the text file is preferentially considered. In this way, an audio type recognition result of the first audio data can be effectively improved. In addition, if it can be directly determined based on the matching result of the text file that the audio type of the first audio data is the audio book, a subsequent process such as the keyword matching processing on the metadata may not be performed. In other words, a processing process can be reduced, and power consumption of the first electronic device can be effectively reduced.

In a possible implementation of the first aspect, a sound effect mode corresponding to the audio book is a first sound effect mode, and a sound effect mode corresponding to the non-audio book is a second sound effect mode. The first sound effect mode and the second sound effect mode may be selected and set according to a user requirement.

In a possible implementation of the first aspect, the keyword matching degree is a quantity of matching keywords.

The keyword matching degree is the quantity of matching keywords, and the matching degree threshold is correspondingly a preset quantity. In this way, the audio type of the first audio data can be more conveniently and accurately determined. Certainly, the keyword matching degree and the matching degree threshold may be alternatively set to other content according to a requirement.

In a possible implementation of the first aspect, if it is determined that the audio type of the first audio data is the audio book, the audio type recognition processing further includes: determining an audio book subtype of the first audio data based on the matching keyword. The determining, based on the audio type and a preset correspondence between an audio type and a sound effect mode, a sound effect mode corresponding to the audio type includes: determining, based on the audio book subtype and a preset correspondence between an audio book subtype and a sound effect mode, a sound effect mode corresponding to the audio book subtype.

The audio book subtype may be a type such as a children audio book or an adult audio book. In this case, different sound effect modes may be set for different types of audio books. In this way, audio data play effect can be further improved, thereby improving user experience.

In a possible implementation of the first aspect, the keyword in the audio book recognition database includes preset identification information of at least one piece of audio book audio data, and the identification information includes at least one type of the following information: title information, album information, author information, publisher information, genre information, artist information, and prologue hot word information of the audio book audio data.

The sound effect mode corresponding to the to-be-played audio data can be more conveniently and accurately determined through keyword setting, and sound effect mode adjustment is performed. In this way, accuracy of audio mode adjustment can be improved, and audio data play effect can be enhanced, thereby improving user experience.

Certainly, the keyword may be alternatively other content other than the foregoing information, and may be selected and set according to a requirement.

In a possible implementation of the first aspect, the method further includes: obtaining the keyword in the audio book recognition database from a cloud server; and/or sending the matching keyword and the determined audio type to the cloud server.

The keyword in the audio book recognition database can be conveniently obtained from the cloud server. The matching keyword and the determined audio type are sent to the cloud server, so that the cloud server can perform update processing on the keyword in the audio book recognition database, to more accurately set the keyword.

Certainly, the first electronic device may alternatively send, to the cloud server according to a requirement, the title information, the album information, the author information, the publisher information, the genre information, the artist information, the prologue hot word information, and the like of the first audio data that are recognized. This may be set according to a requirement.

In a possible implementation of the first aspect, the method further includes: playing second audio data; and if a play instruction of the first audio data is received, determining the first audio data for playing; or if the first audio data sent by a second electronic device is received, determining the first audio data for playing.

To be specific, when playing the second audio data, the first electronic device can more conveniently and accurately determine automatically the sound effect mode corresponding to the to-be-played first audio data, and perform sound effect mode adjustment. In this way, accuracy of audio mode adjustment can be improved, and audio data play effect can be enhanced, thereby improving user experience.

According to a second aspect, an implementation of this application provides an audio play system. The system includes: a first electronic device and a second electronic device. The second electronic device is configured to send, to the first electronic device, first audio data for playing. The first electronic device is configured to: receive the first audio data, and perform content recognition processing on the first audio data, to determine a text file and metadata of the first audio data; perform audio type recognition processing on the first audio data based on the text file and the metadata, to determine an audio type of the first audio data; determine, based on the audio type and a preset correspondence between an audio type and a sound effect mode, a sound effect mode corresponding to the audio type; and play the first audio data based on the sound effect mode.

In a possible implementation of the second aspect, the audio play system further includes a cloud server. An audio book recognition database including a preset keyword is set in the cloud server. The cloud server is configured to send the keyword in the audio book recognition database to the first electronic device, so that the first electronic device performs the audio type recognition processing based on the keyword.

In a possible implementation of the second aspect, the cloud server is further configured to send a matching keyword and the determined audio type to the cloud server.

The audio play system includes an electronic device configured to perform the foregoing audio play method. Therefore, the audio play system also has beneficial effect of the foregoing audio play method. Details are not described herein again.

According to a third aspect, an implementation of this application provides an electronic device, including: a memory, configured to store a computer program, where the computer program includes program instructions; and a controller, configured to execute the program instructions, so that the electronic device performs the audio play method according to the first aspect and/or any possible implementation of the first aspect.

According to a fourth aspect, an implementation of this application provides a computer-readable storage medium. The computer-readable storage medium stores a computer program. The computer program includes program instructions. When the program instructions are run by an electronic device, the electronic device is enabled to perform the audio play method according to the first aspect and/or any possible implementation of the first aspect.

It may be understood that, for beneficial effect of the second aspect to the fourth aspect, reference may be made to related descriptions in the first aspect. Details are not described herein again.

BRIEF DESCRIPTION OF THE DRAWINGS

To describe the technical solutions in this application more clearly, the following briefly describes the accompanying drawings for describing the implementations.

DETAILED DESCRIPTION OF ILLUSTRATIVE EMBODIMENTS

Figure 1:
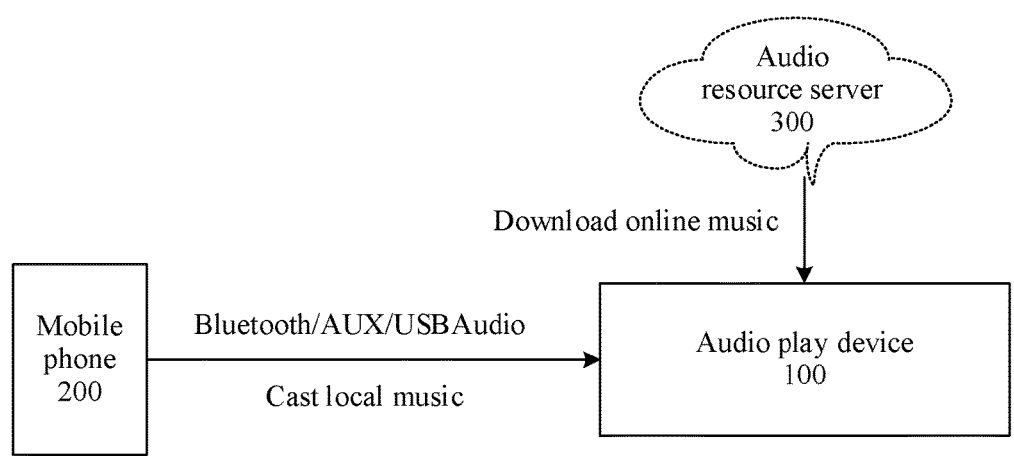
FIG. 1 is a schematic diagram of a structure of an audio play system according to some implementations of this application.

The following further describes the technical solutions of this application in detail with reference to the accompanying drawings.

As described above, a user has different sound effect mode requirements for playing two types of audio data: music and an audio book. Currently, an audio play device usually plays various types of audio data by using a default (or fixed) music play sound effect mode. When an audio book is played, the user needs to manually change, according to a requirement by using a button or an audio play application, the music play sound effect mode to a sound effect mode that is more suitable for playing the audio book, for example, an ultimate human voice sound effect mode. However, the manual adjustment manner not only causes cumbersome user operations, but also affects user experience.

On this basis, an implementation of this application provides an audio play method that may be applied to an audio play device (as an example of a first electronic device). The audio play method includes: The audio play device determines audio data (as an example of first audio data) for playing, and performs content recognition processing on the audio data, to determine a text file and metadata corresponding to the audio data. The content recognition processing includes automatic speech recognition (Automatic Speech Recognition, ASR) processing and metadata recognition processing. The text file is text content corresponding to speech (or audio) content in the audio data, and is usually in a text format. The text file may also be referred to as an audio text. If the audio data is an audio book (for example, may be audio in a type such as a story or Pingshu), the text file of the audio data usually includes at least one type of the following information: title information and prologue hot word information of the audio data. If the audio data is a non-audio book, for example music, the text file of the audio data usually includes lyrics information. In addition, the metadata may be at least one type of the following information: title information, album information, author information, publisher information, genre information, and artist information of the audio data.

Then, the audio play device performs audio type recognition processing on the audio data based on the text file and the metadata, to determine an audio type of the audio data. For example, the audio play device separately performs keyword matching processing (as an example of the audio type recognition processing) on the text file and the metadata with a preset keyword (which may also be referred to as a keyword element or a matching element) in an audio book recognition database, to determine a matching keyword; and then may determine a keyword matching degree based on the matching keyword. The keyword may be, for example, preset identification information of at least one piece of audio book audio data. The identification information may be, for example, at least one type of the following information: title information, album information, author information, publisher information, genre information, artist information, and prologue hot word information of the audio book audio data. The keyword matching degree may be a quantity of matching keywords. In addition, if the keyword matching degree is greater than or equal to a preset matching degree threshold, the audio play device determines that the audio type of the audio data is an audio book. If the keyword matching degree is less than a preset matching degree threshold, the audio play device determines that the audio type of the audio data is a non-audio book (for example, the audio type is music).

In this way, the audio play device can more conveniently and accurately determine the audio type of the audio data automatically by performing the audio type recognition processing such as the keyword matching processing on the text file and the metadata of the audio data. In other words, the audio play device can determine whether the audio type of the audio data is the audio book, that is, can determine whether the audio data is the audio book audio data.

In other words, in this implementation, compared with the manner of performing the audio type recognition processing on the audio data only based on the text file or the metadata, when the audio play device performs the audio type recognition processing on the audio data based on the text file and the metadata, accuracy of an audio type recognition result can be effectively improved, that is, accuracy of audio type recognition can be improved. In addition, even if the metadata of the audio data is inaccurate due to a problem such as production, the audio type recognition processing is performed with reference to the audio text, to effectively ensure the accuracy of the audio type recognition result. Therefore, accuracy of sound effect adjustment can be effectively improved, thereby improving user experience.

In addition, in this implementation, after determining the audio type of the audio data, the audio play device may further determine, based on a preset correspondence between an audio type and a sound effect mode, a sound effect mode corresponding to the audio type; and play the audio data based on the sound effect mode. For example, if the audio play device determines that the audio type of the audio data is the audio book, the audio play device determines that the corresponding sound effect mode is a first sound effect mode, and plays the audio data by using the preset first sound effect mode. Specifically, if a current default sound effect mode of the audio play device is a music play sound effect mode, the audio play device may change the default music play sound effect mode to a sound effect mode (as an example of the first sound effect mode) such as an ultimate human voice sound effect mode in which human voice frequency effect can be significantly improved to better meet a user requirement for playing the audio book.

If the audio type of the audio data is the non-audio book, the audio play device determines that the corresponding sound effect mode is a second sound effect mode, and plays the audio data by using the preset second sound effect mode. For example, if the audio type of the audio data is music, and a current default sound effect mode of the audio play device is a music play sound effect mode, the audio play device continues to play the audio data by using the default music play sound effect mode (as an example of the second sound effect mode). In other words, the sound effect mode does not need to be adjusted.

In this way, the audio play device can more conveniently and accurately determine the audio type of the audio data automatically by performing the audio type recognition processing such as the keyword matching processing on the text file and the metadata of the audio data. In other words, the audio play device can determine whether the audio type of the audio data is the audio book, that is, can determine whether the audio data is the audio book audio data. In addition, the audio play device can automatically determine the sound effect mode corresponding to the audio data, and play the audio data by using the sound effect mode, to automatically determine and adjust the sound effect mode more conveniently and accurately. In other words, in this implementation, the user does not need to manually determine the audio type of the audio data, and does not need to manually adjust the sound effect mode. In this way, accuracy of sound effect adjustment can be effectively improved, and audio data play effect can be enhanced, thereby improving user experience.

Further, in this implementation, if the audio type of the audio data is the audio book, that is, the audio data is the audio book audio data, the audio play device plays the audio data by using the first sound effect mode such as the ultimate human voice sound effect mode corresponding to the audio book audio data, to optimize play sound effect of the audio book. In addition, in the foregoing conventional technologies, the user needs to manually change the default music play sound effect mode to the ultimate human voice sound effect mode when the audio book is played. Compared with this manner, the sound effect mode corresponding to the audio book audio data can be more conveniently and accurately adjusted automatically. In this way, the user does not need to perform manual adjustment, thereby effectively improving user experience.

The following further describes an audio play method and system provided in this application with reference to the accompanying drawings.

For example, FIG. 1 is a schematic diagram of a structure of an audio play system according to an implementation of this application. As shown in FIG. 1, the audio play system includes an audio play device 100 (for example, may be a sound box) that is used as an example of a first electronic device provided in the implementation of this application, and includes an audio resource server 300 and a mobile phone 200 that is used as an example of a second electronic device provided in the implementation of this application.

The audio play device 100 is configured to: receive audio data (or may be referred to as audio stream data) that is sent by an electronic device such as the mobile phone 200 or the audio resource server 300 other than the audio play device 100 and that is used for playing, and play the audio data.

The audio play device 100 may communicate with the mobile phone 200 by using a manner such as Bluetooth (Bluetooth, BT), an audio input interface (Auxiliary, AUX), or an audio driver (USB audio device, USBAudio), to receive audio data that is sent by the mobile phone 200 for casting local music.

In addition, the audio play device 100 may also communicate with the audio resource server 300 by using a wireless network manner such as a wireless local area network (wireless local area network, WLAN) (for example, a wireless fidelity (wireless fidelity, Wi-Fi) network), to download audio data corresponding to online music from the audio resource server 300; and receive the audio data sent by the audio resource server 300.

Certainly, the audio play device 100 may also locally obtain, from the audio play device 100, locally stored audio data used for playing, and play the audio data.

An example in which the audio play device 100 plays the audio data sent by the mobile phone 200 is used below to describe an audio play method provided in an implementation of this application with reference to some display interfaces of the mobile phone 200 and information exchange between the mobile phone 200 and the audio play device 100.

Figure 2A:
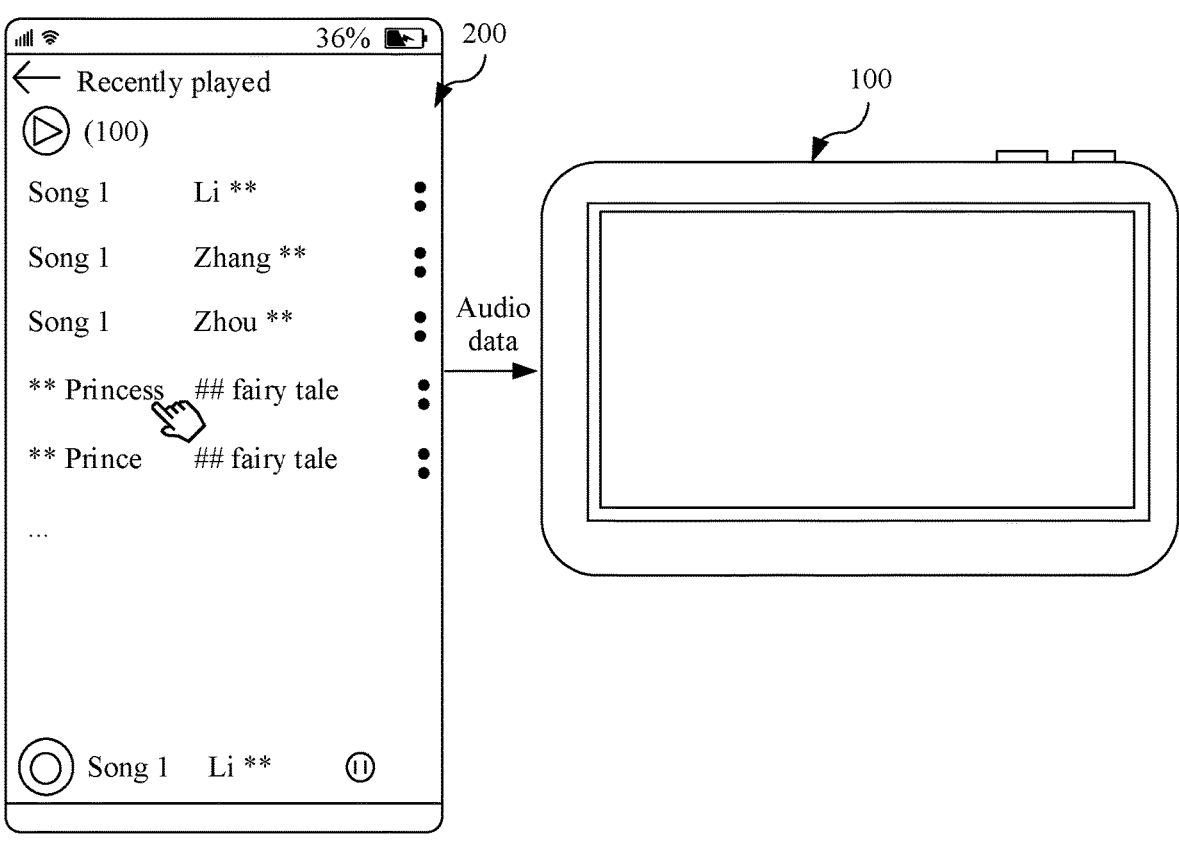
FIG. 2A and FIG. 2B are schematic diagrams of some display interfaces of a mobile phone 200 according to some implementations of this application.

For example, with reference to FIG. 2A, a communication connection is established between the mobile phone 200 and the audio play device 100 in a manner such as BT or Wi-Fi. The mobile phone 200 sends audio data (as an example of second audio data) corresponding to "Song 1" to the audio play device 100, so that the audio play device 100 plays the audio data. After receiving the audio data, if the audio play device 100 determines in the foregoing manner that an audio type of the audio data is music audio data, the audio play device 100 plays the audio data in a default music play sound effect mode, that is, plays "Song 1".

Still with reference to FIG. 2A, if the mobile phone 200 receives a tap operation performed by a user on "princess", the mobile phone 200 sends audio data (as an example of first audio data) corresponding to "princess" to the audio play device 100, so that the audio play device 100 plays the audio data. After receiving the audio data, if the audio play device 100 determines in the foregoing manner that an audio type of the audio data is an audio book, the audio play device 100 automatically changes a default music play sound effect mode to an ultimate human voice sound effect mode, and plays the audio data by using the ultimate human voice sound effect mode, that is, plays "**princess".

In other words, in this implementation, in a process in which the user uses the mobile phone 200 to play audio data on demand or cast audio data to the audio play device 100 for playing, after receiving the audio data, the audio play device 100 may automatically determine an audio type of the audio data that needs to be played, automatically determine a sound effect mode corresponding to the audio type, and automatically play the audio data by using the corresponding sound effect mode. In this way, the user does not need to manually perform a sound effect mode adjustment operation, thereby effectively improving user experience. In addition, play sound effect or play effect of the audio data can be effectively ensured, thereby also improving user experience.

In this implementation, after performing sound effect mode adjustment, the audio play device 100 may not need to prompt the user to perform the sound effect mode adjustment. In other words, the sound effect mode adjustment can be implemented in a senseless manner, thereby effectively improving user experience.

In some other implementations of this application, after the audio play device 100 performs the sound effect mode adjustment, for example, after the audio play device 100 changes the sound effect mode from a music play mode to the ultimate human voice sound effect mode, the audio play device 100 may also notify, in a manner such as playing an alert tone or broadcasting a speech, the user of information that the sound effect mode has been adjusted.

In some other implementations of this application, after changing the sound effect mode from the music play mode to the ultimate human voice sound effect mode, the audio

Figure 2B:
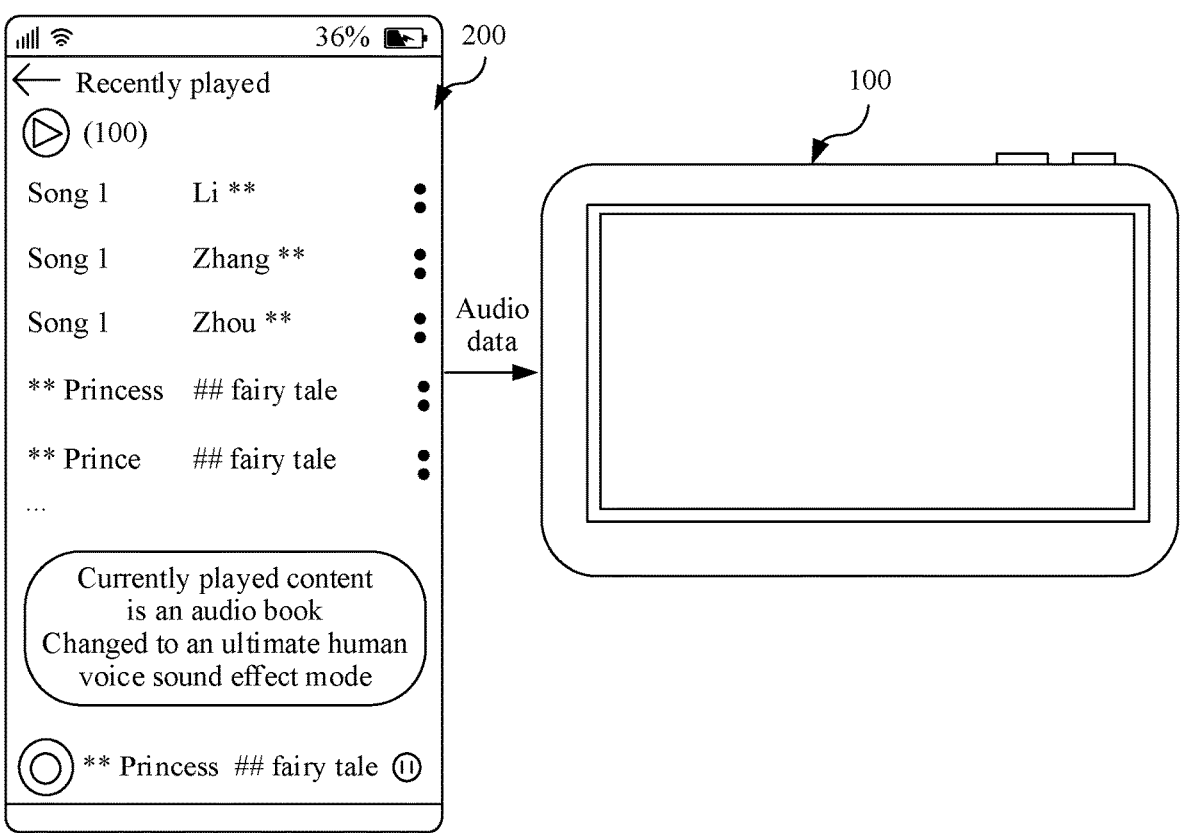

10 play device 100 may further send, to the mobile phone 200, notification information used to notify the user that the sound effect mode has been adjusted. After receiving the notification information, the mobile phone 200 may display the notification information. For example, the notification information may be "Currently played content is an audio book. Changed to the ultimate human voice sound effect mode." shown in FIG. 2B. Certainly, the notification information may also be set to another display or other content according to a requirement.

In this way, the user can be conveniently reminded of the sound effect mode adjustment, thereby effectively improving user experience.

The following further describes a structure of the audio play device 100 that is used as an example of the first electronic device provided in an implementation of this application.

Figure 3:
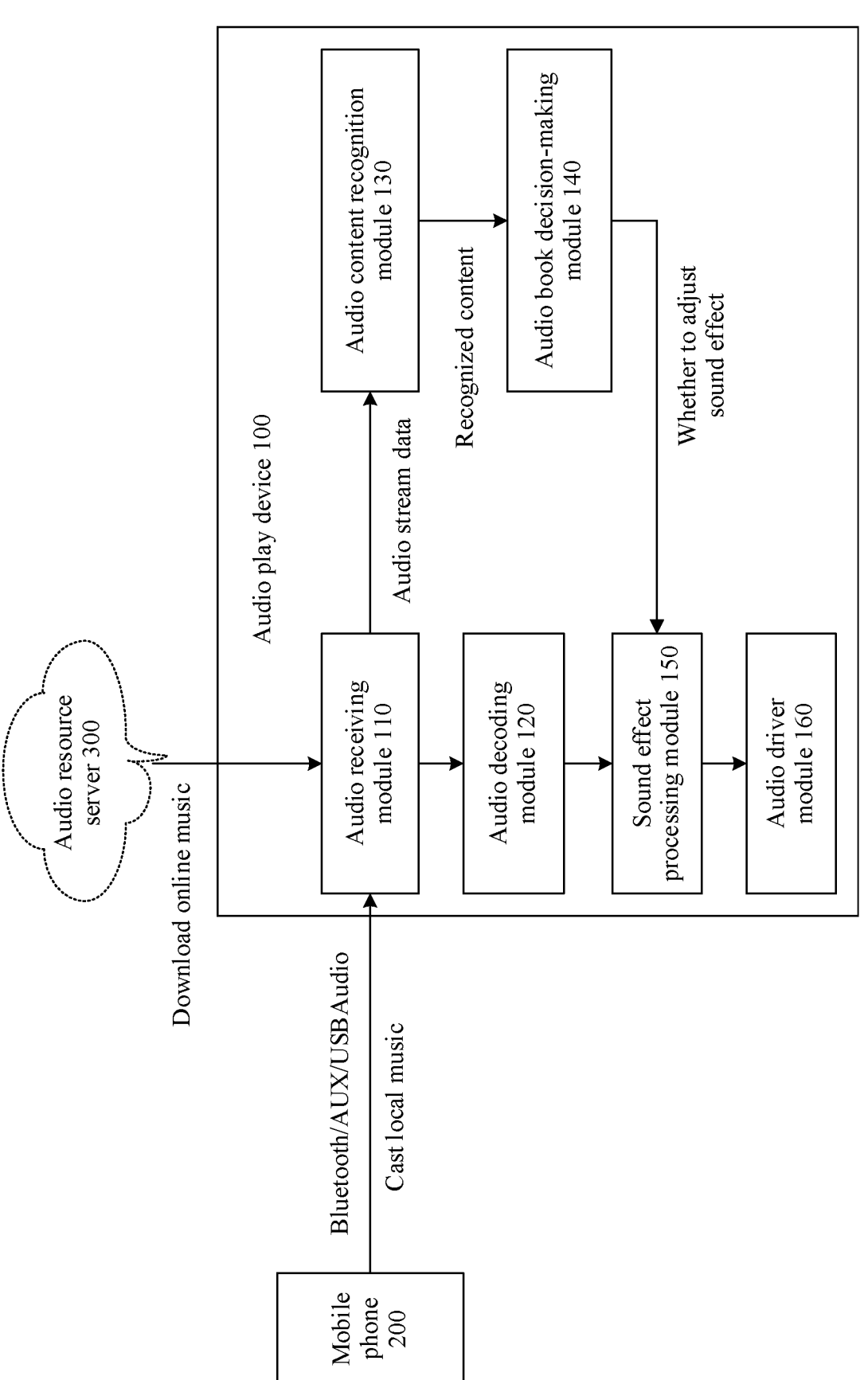
FIG. 3 is a schematic diagram of a structure of an audio play device 100 according to some implementations of this application.

For example, FIG. 3 is a schematic diagram of a structure of an audio play device 100. As shown in FIG. 3, the audio play device 100 includes an audio receiving module 110, an audio decoding module 120, an audio content recognition module 130, an audio book decision-making module 140, a sound effect processing module 150, and a sound effect driver module 160.

The audio receiving module 110 is configured to receive audio data (or may be referred to as audio stream data) that is sent by the foregoing electronic device such as the mobile phone 200 or the audio resource server 300 other than the audio play device 100 and that is used for playing.

In addition, the audio receiving module 110 may communicate with the mobile phone 200 by using the foregoing manner such as BT, AUX, or USBAudio, to receive audio data that is sent by the mobile phone 200 for casting local music.

In addition, the audio receiving module 110 may also communicate with the audio resource server 300 by using the foregoing wireless network manner such as a wireless local area network, to download audio data corresponding to online music from the audio resource server 300; and receive the audio data sent by the audio resource server 300.

Certainly, as described above, the audio receiving module 110 may also locally obtain, from the audio play device 100, locally stored audio data for playing.

In addition, the audio receiving module 110 is further configured to separately send the received audio data to the audio decoding module 120 and the audio content recognition module 130.

The audio decoding module 120 is configured to perform processing such as decoding on audio data that needs to be played, to prepare for sound effect processing in a next step for playing the audio data.

The audio content recognition module 130 is configured to perform content recognition processing on the received audio data. The content recognition processing includes: performing automatic speech recognition processing to obtain a text file of the audio data, and performing recognition processing or extraction processing on metadata of the audio data to obtain the foregoing metadata.

In addition, the audio content recognition module 130 is further configured to send content obtained through content recognition, namely, the text file and the metadata, as a content recognition result to the audio book decision-making module 140.

The audio book decision-making module 140 is configured to: receive the text file and the metadata that are sent by the audio content recognition module 130, and perform audio type recognition processing on the audio data based on the text file and the metadata, to obtain an audio type of the audio data. For example, the audio book decision-making module 140 separately performs keyword matching processing on the text file and the metadata with a preset keyword in an audio book recognition database, to determine a matching keyword; and determines a keyword matching degree based on the matching keyword. The keyword matching degree may be a quantity of matching keywords.

The keyword may be, for example, the foregoing preset identification information of at least one piece of audio book audio data. The identification information may be, for example, at least one type of the following information: title information, album information, author information, publisher information, genre information, artist information, and prologue hot word information of the audio book audio data.

The title information and the album information may be, for example, information such as names of popular readings, novels, and Pingshu, for example, Mi Xiaoquan's School Diary, Romance of the Three Kingdoms, and Journey to the West.

The author information and the publisher information may be, for example, information such as a popular publisher and a famous publisher, for example, Himamaya production, Hima Lectures, or Fan Deng Reading.

The genre information may be, for example, information such as nationalism and neoclassicism.

The artist information may be, for example, information such as information about a reader of an audio book.

For example, a prologue hot word may be a commonly used prologue of an audio book, for example, information such as welcome to, an audio novel, a story, Chapter N, Episode N, and Section N.

Certainly, the metadata may alternatively include other information, and may be selected and set according to a requirement.

In addition, if the keyword matching degree is greater than or equal to a preset matching degree threshold, it may be determined that the audio type of the audio data is an audio book. If the keyword matching degree is less than a preset matching degree threshold, it may be determined that the audio type of the audio data is a non-audio book, for example, may be music or another type. The audio type recognition processing is performed on the audio data based on the text file and the metadata, to effectively improve accuracy of an audio type recognition result.

In addition, the audio book decision-making module 140 is further configured to send audio type information (that is, information indicating whether the audio type of the audio data is the audio book) of the audio data to the sound effect processing module 150, so that the sound effect processing module 150 determines whether to adjust sound effect.

The sound effect processing module 150 is configured to: receive the audio data that is sent by the audio decoding module 120 and that is obtained after processing such as decoding, receive the audio type information sent by the audio book decision-making module 140, determine a sound effect mode corresponding to the audio type, that is, determine the sound effect mode for playing the audio data, and determine whether to adjust the sound effect.

For example, if the audio type of the audio data is the audio book, the sound effect processing module 150 determines that the corresponding sound effect mode is the first sound effect mode such as the foregoing ultimate human voice sound effect mode, and the sound effect processing module 150 may change the sound effect mode to the first sound effect mode to play the audio data. For the audio book, a user usually expects a human voice to be clear and prominent. Therefore, the first sound effect mode may be, for example, a sound effect mode in which human voice frequency effect can be significantly improved, such as ultimate human voice sound effect. In this way, audio book play effect is better, and playing of the audio book can better meet a user requirement, thereby effectively improving user experience.

If the audio type of the audio data is the non-audio book, the sound effect processing module 150 determines that the corresponding sound effect mode is the foregoing second sound effect mode. To be specific, for example, if the audio type of the audio data is music, the sound effect processing module 150 determines to continue playing the audio data by using the default music play sound effect mode. In other words, sound effect mode adjustment does not need to be performed.

In addition, the sound effect processing module 150 is further configured to: perform corresponding sound effect processing on the audio data based on the determined sound effect mode, and send, to the audio driver module 160, the audio data obtained after the sound effect processing.

The sound effect driver module 160 is configured to: receive the audio data sent by the sound effect processing module 150, and perform, by using a component such as a speaker or a loudspeaker (not shown in the figure), play processing on the received audio data obtained after sound effect processing, to play the audio data.

Further, in this implementation, the audio receiving module 110, the audio decoding module 120, the audio content recognition module 130, the audio book decision-making module 140, and the sound effect processing module 150 that are included in the audio play device 100 may all be located at an application layer of a software system of the audio play device 100, and the sound effect driver module 160 may be located at a kernel layer of the software system of the audio play device 100. Certainly, each module may also be disposed at another layer of the software system according to a requirement.

Certainly, the audio play device 100 provided in this implementation may further include more or fewer modules or components, for example, may further include a component such as a speaker, a loudspeaker, or a power supply. The component may be selected and disposed according to a requirement.

The following further describes a structure of the mobile phone 200 that is used as an example of the second electronic device provided in an implementation of this application.

Figure 4:
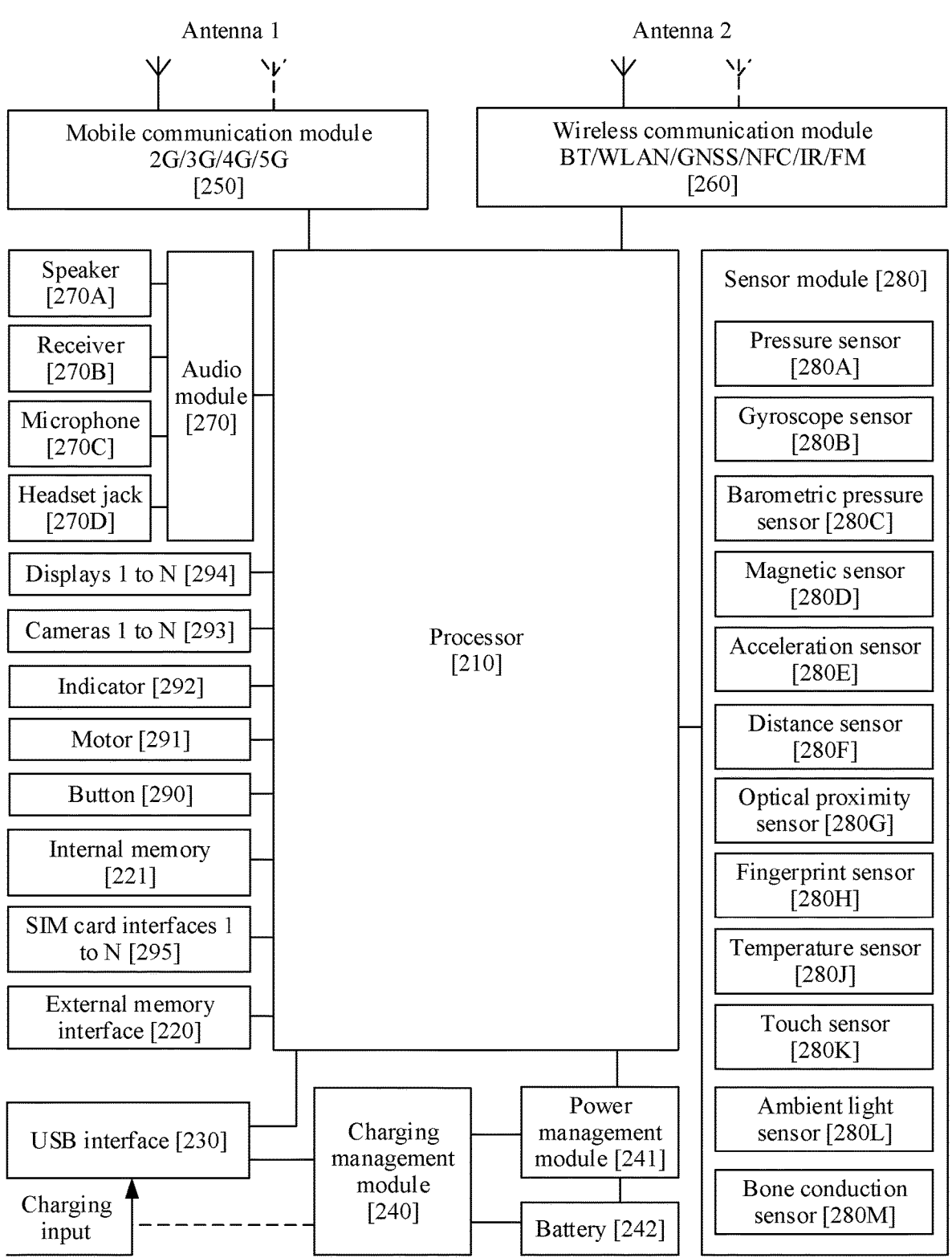
FIG. 4 is a schematic diagram of a structure of a mobile phone 200 according to some implementations of this application.

For example, FIG. 4 is a schematic diagram of a structure of a mobile phone 200. As shown in FIG. 4, the mobile phone 200 may include a processor 210, an external memory interface 220, an internal memory 221, a universal serial bus (universal serial bus, USB) connector 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure illustrated in this embodiment of the present invention does not constitute a specific limitation on the mobile phone 200. In some other embodiments of this application, the mobile phone 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The processor may generate an operation control signal based on an instruction operation code and a time sequence signal to complete control of instruction fetching and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces a waiting time of the processor 210, thereby improving system efficiency.

A wireless communication function of the mobile phone 200 may be implemented by using the antenna 1, the antenna 2, the mobile communication module 250, the wireless communication module 260, the modem processor, the baseband processor, and the like. The mobile communication module 250 may provide a wireless communication solution including 2G/3G/4G/5G that is applied to the mobile phone 200. The wireless communication module 260 may provide a wireless communication solution applied to the mobile phone 200, for example, a wireless local area network (wireless local area network, WLAN) (for example, a wireless fidelity (wireless fidelity, Wi-Fi) network) and Bluetooth (Bluetooth, BT). In some embodiments, in the mobile phone 200, the antenna 1 and the mobile communication module 250 are coupled, and the antenna 2 and the wireless communication module 260 are coupled, so that the mobile phone 200 can communicate with a network and another device by using a wireless communication technology.

The mobile phone 200 implements a display function by using the GPU, the display 294, the application processor, and the like. The GPU is a microprocessor for image processing, and is connected to the display 294 and the application processor. The GPU is configured to: perform mathematical and geometric calculation, and render an image. The processor 210 may include one or more GPUs that execute program instructions to generate or change display information.

The display 294 is configured to display an image, a video, and the like. The display 294 includes a display panel. In some embodiments, the mobile phone 200 may include one or N displays 294, where N is a positive integer greater than 1. For example, the display is configured to display the content shown in FIG. 2A and FIG. 2B.

The internal memory 221 may be configured to store computer-executable program code. The executable program code includes instructions. The internal memory 221 may include a program storage area and a data storage area. The program storage area may store an operating system, an application required by at least one function (for example, a sound play function and an image play function), and the like. The data storage area may store data (for example, audio data and s phone book), and the like created when the mobile phone 200 is used. In addition, the internal memory 221 may include a high-speed random access memory, and may further include a nonvolatile memory, for example, at least one magnetic disk storage device, a flash storage device, and a universal flash storage (universal flash storage, UFS). The processor 210 runs the instructions stored in the internal memory 221 and/or the instructions stored in the memory disposed in the processor, to perform various function applications and data processing of the mobile phone 200. For example, related processing such as sending the audio data to the audio play device 100 is performed.

Figure 5:
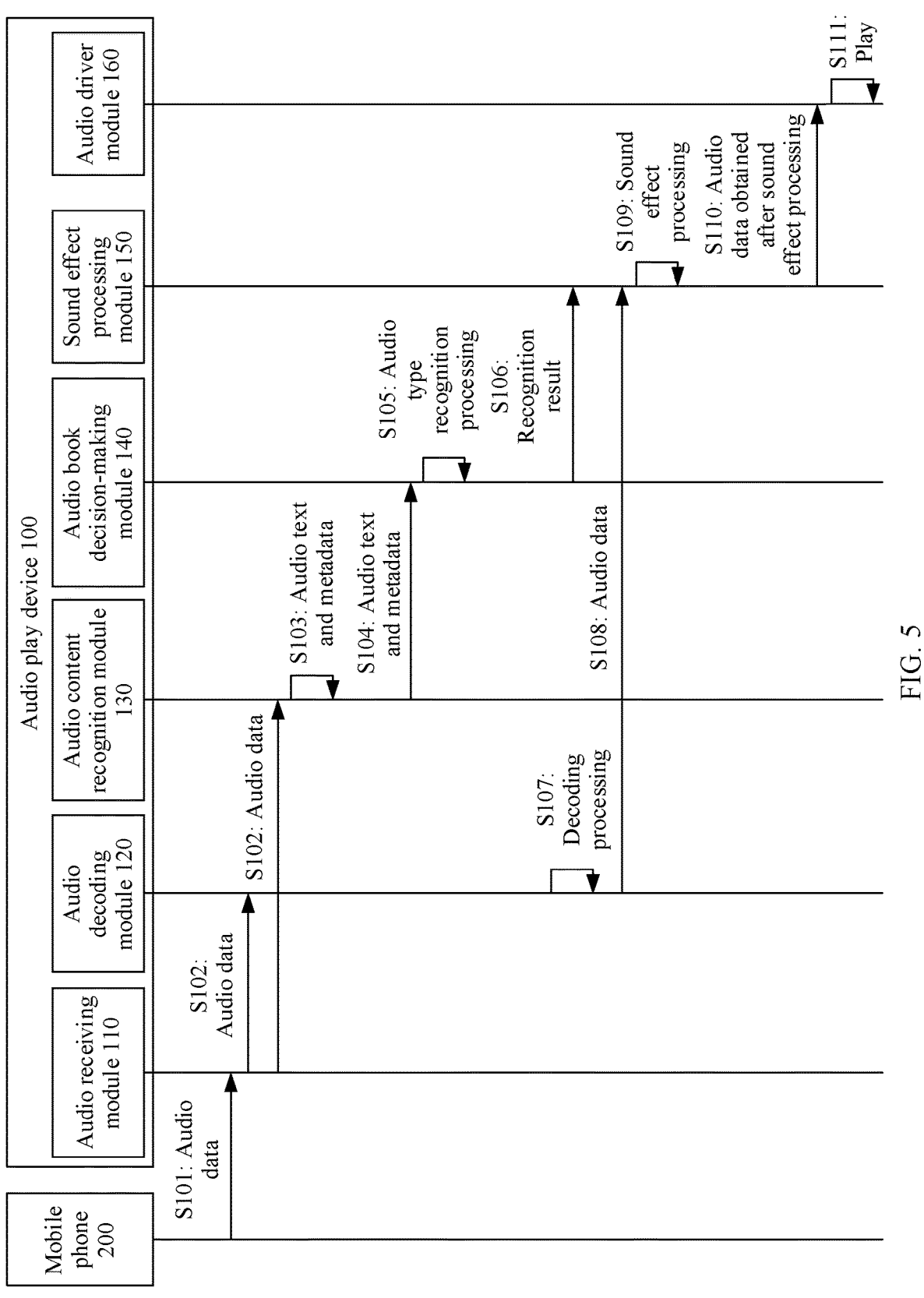
FIG. 5 is a schematic flowchart of an audio play method according to some implementations of this application.

With reference to the flowchart, the following further describes an audio play method provided in an implementation of this application. With reference to FIG. 5, the audio play method provided in this implementation includes the following processes:

S101: The audio play device 100 establishes a communication connection to the mobile phone 200. After detecting the tap operation performed by the user on "**princess" shown in FIG. 2A, the mobile phone 200 sends audio data to the audio play device 100. The audio receiving module 110 in the audio play device 100 receives the audio data sent by the mobile phone 200.

S102: The audio receiving module 110 separately sends the audio data to the audio decoding module 120 and the audio content recognition module 130 in the audio play device 100. The audio decoding module 120 then performs step S107, and the audio content recognition module 130 then performs step S103.

S103: The audio content recognition module 130 performs content recognition processing on the received audio data to obtain a corresponding text file and corresponding metadata.

Specifically, the audio content recognition module 130 selects a segment of audio data within a preset time period, and performs automatic speech recognition processing on the audio data, to obtain text content corresponding to speech content of the audio data and use the text content as a text file.

A value range of the preset time period may be 10 s to 60 s, for example, may be 10 s, 20 s, 35 s, 60 s, or the like. Certainly, a value of the preset time period may be alternatively selected and set to any other value according to a requirement.

Certainly, the audio content recognition module 130 may also perform the automatic speech recognition processing on all the audio data to obtain a text file corresponding to speech content of the audio data.

In addition, if the audio data is an audio book, a text file of the audio data usually includes at least one type of the following information: title information and prologue hot word information of the audio data. If the audio data is a non-audio book such as music, a text file of the audio data usually includes lyrics information.

In addition, the audio content recognition module 130 performs recognition processing or extraction processing on the metadata of the audio data to obtain the metadata. The metadata includes at least one type of the following information: title information, album information, author information, publisher information, genre information, artist information, and prologue hot word information of the foregoing audio data. Details are not described herein again.

S104: The audio content recognition module 130 sends the text file and the metadata to the audio book decision-making module 150.

S105: The audio book decision-making module 140 receives the text file and the metadata that are sent by the audio content recognition module 130, and performs audio type recognition processing on the audio data based on the text file and the metadata, to determine an audio type of the audio data.

For example, the audio book decision-making module 140 separately performs keyword matching processing (or may be referred to as comparison processing) on the text file and the metadata with a locally preset keyword in an audio book recognition database, determines a matching keyword, and determines a keyword matching degree based on the matching keyword. The keyword included in the audio book recognition database may be, for example, at least one type of the following information: title information, album information, author information, publisher information, genre information, artist information, and prologue hot word information of the foregoing audio book audio data. Details are not described herein again.

The audio book decision-making module 140 separately performs the keyword matching processing on the text file and the metadata with the preset keyword in the audio book recognition database, that is, determines a quantity of keywords that are in the text file and that match the keyword, and determines a quantity of keywords that are in the metadata and that match the keyword.

In addition, the keyword matching degree may be a quantity of matching keywords. For example, a value range of the keyword matching degree may be 2 to 6, for example, 2, 5, or 6. Certainly, a value of the keyword matching degree may be alternatively set to any other value according to a requirement, and may be set according to a requirement.

In addition, in this implementation, if the keyword matching degree is greater than or equal to a preset matching degree threshold, it may be determined that the audio type of the audio data is the audio book. In other words, it is determined that the audio data is the audio book audio data.

Specifically, refer to Table 1. Table 1 shows some examples of determining, based on the quantity of matching keywords, whether the audio type of the audio data is the audio book.

TABLE 1

| ASR text matching element quantity | Metadata matching element quantity | Audio type recognition result |
|---|---|---|
| ≥1 | ≥1 | Determined as an audio book |
| >2 | 0 | Determined as an audio book |
| 1 | 0 | Not determined as an audio book |
| 0 | 2 | Determined as an audio book |
| 0 | 1 | Not determined as an audio book |

It can be learned that if a sum of the ASR text matching element quantity (a matching element quantity is a quantity of matching keywords, and the ASR text matching element quantity is used as an example of a first keyword matching degree) and the metadata matching element quantity (used as an example of a second keyword matching degree) is greater than or equal to a matching degree threshold 2, it may be determined that the audio type of the audio data is the audio book (that is, an audio type recognition result is "Determined as an audio book"). If a sum of the ASR text matching element quantity and the metadata matching element quantity is less than a matching degree threshold 2, it may be determined that the audio type of the audio data is the non-audio book (that is, an audio type recognition result is "Not determined as an audio book").

In addition, in this implementation, during the keyword matching processing, the audio book decision-making module 140 may preferentially perform ASR text matching to obtain the ASR text matching element quantity. If it is determined that the ASR text matching element quantity is greater than or equal to the foregoing matching degree threshold 2, it may be directly determined that the audio type of the audio data is the audio book. If it is determined that the ASR text matching element quantity is less than the foregoing matching degree threshold 2, metadata matching is performed to obtain the metadata matching element quantity. In addition, if the sum of the ASR text matching element quantity and the metadata matching element quantity is greater than or equal to the foregoing matching degree threshold 2, it may be determined that the audio type of the audio data is the audio book. If the sum of the ASR text matching element quantity and the metadata matching element quantity is less than the foregoing matching degree threshold 2, it may be determined that the audio type of the audio data is the non-audio book.

In this implementation, compared with the manner of performing the audio type recognition processing on the audio data only based on the text file or the metadata, when the audio book decision-making module 140 performs the audio type recognition processing on the audio data based on the text file and the metadata, accuracy of the audio type recognition result can be effectively improved, that is, accuracy of audio type recognition can be improved. In addition, in this implementation, even if the metadata of the audio data is inaccurate due to a problem such as production, the audio type recognition processing is performed with reference to the audio text, to effectively ensure accuracy of the audio type recognition result.

S106: The audio book decision-making module 140 sends audio type information (that is, information indicating whether the audio data is the audio book audio data) of the audio data as a recognition result to the sound effect processing module 150, so that the sound effect processing module 150 determines whether to adjust sound effect.

S107: The audio decoding module 120 performs processing such as decoding on the audio data, to prepare for sound effect processing in a next step for playing the audio data.

S108: The audio decoding module 120 sends, to the sound effect processing module 140, the audio data obtained after the processing such as decoding.

S109: The sound effect processing module 150 receives the audio data that is sent by the audio decoding module 120 and that is obtained after processing such as decoding; receives the audio type sent by the audio book decision-making module 140; determines, based on the audio type and a preset correspondence between an audio type and a sound effect mode, a sound effect mode corresponding to the audio type, that is, determines the sound effect mode for playing the audio data; and determines whether to adjust the sound effect.

For example, the preset correspondence between the sound effect type and the sound effect mode may be shown in Table 2.

TABLE 2

| Sound effect type | Sound effect mode |
|---|---|
| Audio book | First sound effect mode (for example, an ultimate human voice sound effect mode) |
| Non-audio book | Second sound effect mode (for example, a music play sound effect mode) |

To be specific, if the audio type is the audio book, the sound effect processing module 150 determines that the sound effect mode corresponding to the audio type is the first sound effect mode such as the ultimate human voice sound effect mode, and the sound effect processing module 150 may change the sound effect mode to the preset first sound effect mode to play the audio data. The first sound effect mode may be, for example, a sound effect mode in which human voice frequency effect can be significantly improved, such as ultimate human voice sound effect. In this way, audio book play effect is better, and playing of the audio book can better meet a user requirement, thereby effectively improving user experience.

If the audio type is the non-audio book, the sound effect processing module 150 determines that the sound effect mode corresponding to the audio type is the foregoing second sound effect mode. To be specific, for example, if the audio type is music, the sound effect processing module 150 determines to continue to play the audio data by using a default music play sound effect mode. In other words, sound effect mode adjustment does not need to be performed.

In addition, the sound effect processing module 150 may further perform corresponding sound effect processing on the audio data based on the determined sound effect mode, and perform the following step S110 to send, to the audio driver module 160, the audio data obtained after the sound effect processing.

S110: The sound effect processing module 150 sends, to the audio driver module 160, the audio data obtained after the sound effect processing.

S111: The sound effect driver module 160 receives the audio data that is sent by the sound effect processing module 150 and that is obtained after the sound effect processing, and performs play processing on the audio data obtained after the sound effect processing, to play the audio data by using a component such as a speaker or a loudspeaker.

In this implementation, the audio play device 100 can more conveniently and accurately determine automatically whether the audio data is the audio book audio data, by performing the audio type recognition processing such as the keyword recognition processing on the text file and the metadata of the audio data. In addition, if the audio type of the audio data is the audio book, the audio data is played by using the first sound effect mode corresponding to the audio type of the audio book. Automatic adjustment of the first sound effect mode corresponding to the audio book audio data can be conveniently implemented. The user does not need to manually adjust the first sound effect mode, thereby effectively improving user experience. If the audio type is the non-audio book, the sound effect processing module 150 determines to play the audio data by using the second sound effect mode corresponding to the audio type of the non-audio book. For example, if the audio type is music, the sound effect processing module 150 determines to continue to play the audio data by using the default music play sound effect mode. In other words, sound effect mode adjustment does not need to be performed.

Figure 6:
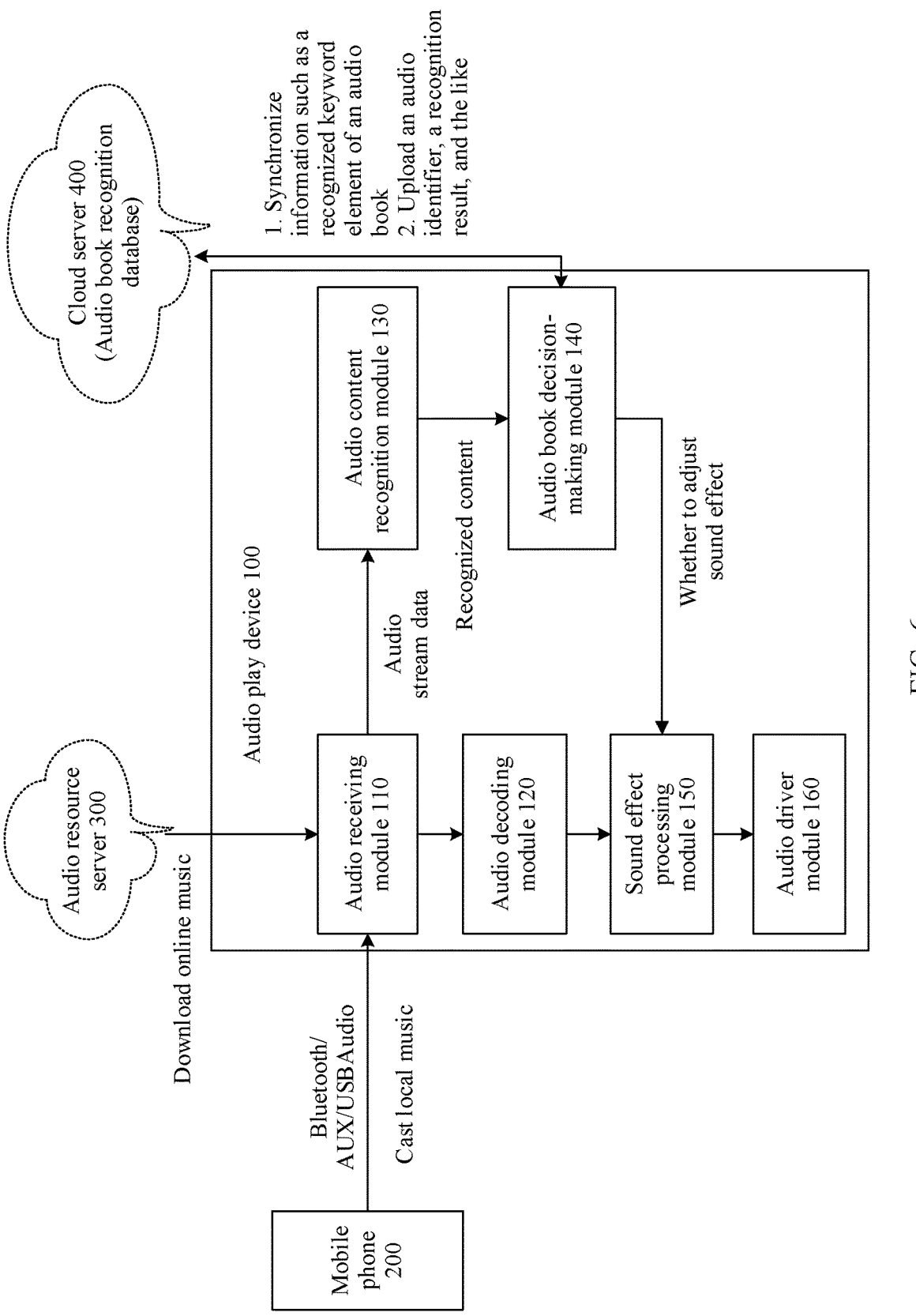
FIG. 6 is a schematic diagram of a structure of another audio play system according to some implementations of this application.

Further, refer to FIG. 6. In some other implementations of this application, the audio play system may further include a cloud server 400. An audio book recognition database is set in the cloud server 400. The audio book recognition database includes several preset keywords. The cloud server 400 is configured to send the keyword in the audio book recognition database to the audio play device 100, so that the audio play device 100 performs audio type recognition processing based on the keyword. To be specific, the audio book decision-making module 140 may obtain the keyword from the audio book recognition database of the cloud server 400, to synchronize information such as a keyword element quantity of the audio book; and perform the audio type recognition processing, thereby effectively improving accuracy of audio type recognition.

Further, in some other implementations of this application, after step S105, the audio book decision-making module 140 in the audio play device 100 may further send, as a recognition result, the matching keyword (which may also be referred to as audio identification information) and information about the determined audio type to the cloud server 400. Therefore, the cloud server 400 adds the keyword to the audio book recognition database for subsequent recognition of the audio book or for another electronic device to obtain the keyword from the cloud server 400.

Further, in some other implementations of this application, the audio book decision-making module 140 is further configured to: after it is determined that the audio type of the audio data is the audio book, determine an audio book subtype of the audio data based on the matching keyword. The audio book subtype may be a children audio book, an adult audio book, or the like. In addition, the audio book decision-making module 140 continues to determine, based on the audio book subtype and a preset correspondence between an audio book subtype and a sound effect mode, a sound effect mode corresponding to the audio book subtype. Correspondingly, for step S105, after it is determined that the audio data is the audio book audio data, the audio book decision-making module 140 further performs this part of operations to determine the audio book subtype.

For example, the audio book subtype may be classified based on an age of readers of the audio book. For example, the audio book subtype may include a children audio book and an adult audio book. Alternatively, the audio book subtype may be classified based on a gender of readers, for example, a female audio book and a male audio book. Alternatively, the audio book subtype may be classified based on a theme of the audio book, for example, an audio book of a military theme, an audio book of a science fiction theme, and an audio book of a martial arts theme.

After determining the audio book subtype corresponding to the audio data, the audio book decision-making module 140 sends the audio book subtype information to the sound effect processing module 150.

The sound effect processing module 150 determines a corresponding sound effect mode based on the audio book subtype and a preset correspondence between an audio book subtype and a sound effect mode, to play the audio data.

In this implementation, different sound effect modes may be preset in the sound effect processing module 150 for different audio book subtypes. For example, the preset correspondence between the audio book subtype and the sound effect mode may be shown in Table 3.

TABLE 3

| Sound effect type | Sound effect mode |
| --- | --- |
| Children audio book | Ultimate childish voice sound effect mode |
| Adult audio book | Ultimate mature human voice sound effect mode |
| . . . | . . . |
| Female audio book | Ultimate female voice sound effect mode |
| Male audio book | Ultimate male voice sound effect mode |
| . . . | . . . |
| Audio book of a military theme | . . . |
| Audio book of a science fiction theme | . . . |
| Audio book of a martial arts theme | . . . |
| . . . | . . . |

To be specific, if the sound effect processing module 150 determines that the audio type is the children audio book, the audio data is played by using the ultimate childish sound effect mode; or if the sound effect processing module 150 determines that the audio type is the male audio book, the audio data is played by using the ultimate male voice sound effect mode.

In this way, the audio play device 100 may play different types of audio book audio data by using different sound effect modes. In this way, accuracy of sound effect adjustment can be effectively improved, and audio book play effect can be enhanced, thereby improving user experience.

In some other implementations of this application, the audio receiving module 110 may also be an audio data storage module. The audio data storage module is configured to store local audio data of the audio play device 100. When the audio data needs to be played (for example, when a play instruction of the audio data is received), the audio data storage module sends the audio data to the audio decoding module 120 and the audio content recognition module 130, to perform the subsequent audio data type recognition processing. In other words, in this implementation, the audio play device 100 may send the locally stored audio data to the audio decoding module 120 and the audio content recognition module 130 for corresponding processing, to play the local audio data.

In some other implementations of this application, the audio book decision-making module 140 may also be referred to as an audio type decision-making module, and may be selected and set according to a requirement.

In some other implementations of this application, the keyword may be alternatively another type of information used to identify an audio book other than title information, album information, author information, publisher information, genre information, artist information, and prologue hot word information of the audio book audio data, and may be selected and set according to a requirement. The metadata may be alternatively other information other than title information, album information, author information, publisher information, genre information, and artist information of the first audio data, and may be selected and set according to a requirement.

In some other implementations of this application, the keyword matching degree may be alternatively information such as a proportion of a keyword to a total quantity of all recognized elements other than the quantity of matching keywords, and may be selected and set according to a requirement.

In some other implementations of this application, the audio type recognition processing may be alternatively another processing manner other than the keyword matching processing, and may be selected and set according to a requirement.

In some other implementations of this application, the audio play device 100 used as an example of the first electronic device may be a sound box, a headset, a portable media player, an e-book, a reading device, a mobile phone, a tablet computer, a notebook computer, a palmtop computer, a mobile Internet device (mobile internet device, MID), a wearable device (for example, a smart watch, a smart band, or a pedometer), a personal digital assistant, a virtual reality device and/or an augmented reality device, an Internet of things device, a streaming media client device, a vehicle-mounted device, and another device.

In some other implementations of this application, the mobile phone 200 used as an example of the second electronic device may be the foregoing audio resource server 300, or another electronic device such as a tablet computer, a notebook computer, or a palmtop computer.

As the audio book industry develops increasingly rapidly, the audio play method provided in the implementations of this application is applied to an audio play scenario. It can be automatically and conveniently identified whether the audio data is the audio book audio data. The audio book audio data can be automatically played by using the preset first sound effect mode that better meets a requirement for playing the audio book audio data. In addition to an object of optimizing audio book play effect, the user may not need to perform sound effect adjustment, thereby effectively improving user experience. This is a method for optimizing sound effect of the audio book.

Figure 7:
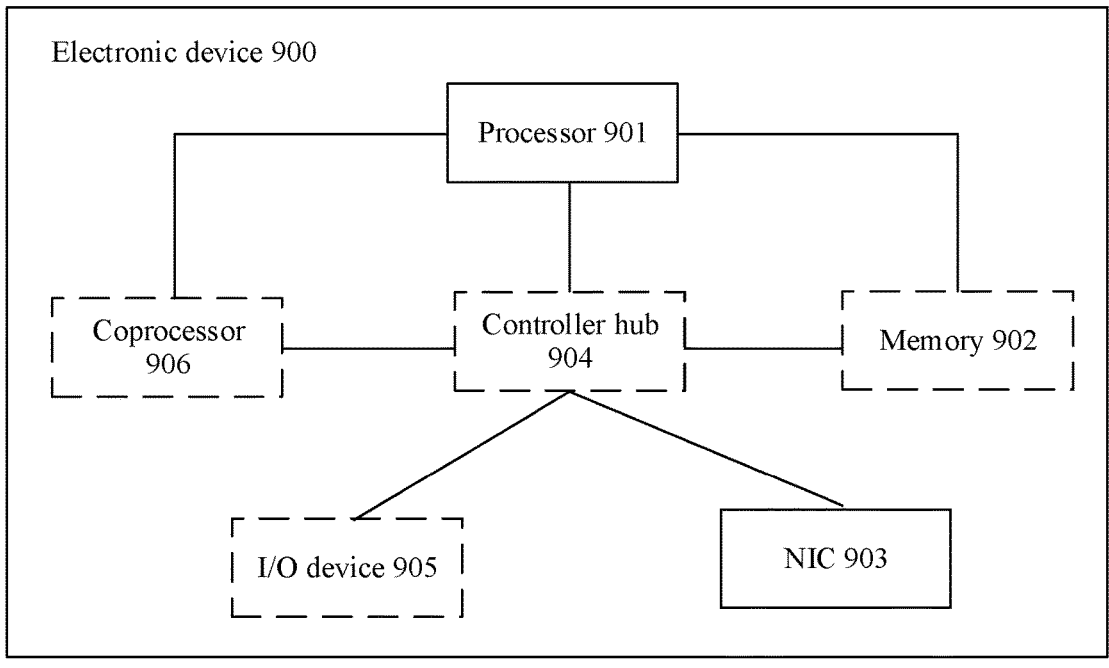
FIG. 7 is a schematic diagram of a structure of an electronic device according to some implementations of this application.

FIG. 7 is a schematic diagram of a structure of an electronic device 900 according to an implementation of this application. The electronic device 900 may include one or more processors 901 coupled to a controller hub 904. For at least one embodiment, the controller hub 904 communicates with the processor 901 through a multi-branch bus such as a front-side bus (Front Side Bus, FSB), a point-to-point interface such as a quickpath interconnect (QuickPath Interconnect, QPI), or a similar connection. The processor 901 executes instructions for controlling a general type of data processing operation. In an embodiment, the controller hub 904 includes, but is not limited to, a graphics memory controller hub (Graphics Memory controller hub, GMCH) (not shown in the figure) and an input/output hub (IOH) (which may be on separate chips) (not shown in the figure). The GMCH includes a memory and a graphics controller, and is coupled to the IOH.

The electronic device 900 may further include a coprocessor 906 and a memory 902 that are coupled to the controller hub 904. Alternatively, one or both of the memory 902 and the GMCH may be integrated into the processor 901 (as described in this application). The memory 902 and the coprocessor 906 are directly coupled to the processor 901 and the controller hub 904. The controller hub 904 and the IOH are located in a single chip.

The memory 902 may be, for example, a dynamic random access memory (Dynamic Random Access Memory, DRAM), a phase change memory (Phase Change Memory, PCM), or a combination thereof.

In an embodiment, the coprocessor 906 is a dedicated processor, for example, a high-throughput many integrated core (Many Integrated Core, MIC) processor, a network or communication processor, a compression engine, a graphics processor, a general-purpose graphics processing unit (General-Purpose Graphics Processing Unit, GPGPU), or an embedded processor. An optional property of the coprocessor 906 is shown in FIG. 7 by using a dashed line.

In an embodiment, the electronic device 900 may further include a network interface (Network Interface Card, NIC) 903. The network interface 903 may include: a transceiver, configured to provide a radio interface for the electronic device 900 to further communicate with any other appropriate device (such as a front-end module or an antenna). In various embodiments, the network interface 903 may be integrated with another component of the electronic device 900. The network interface 903 may implement functions of a communication unit in the foregoing embodiment.

The electronic device 900 may further include an input/output (I/O) device 905. The input/output (I/O) device 905 may include: a user interface through which a user can interact with the electronic device 900; a peripheral component interface through which a peripheral component can also interact with the electronic device 900; and/or a sensor, configured to determine an environmental condition and/or location information associated with the electronic device 900.

It should be noted that FIG. 7 is merely used as an example. To be specific, although FIG. 7 shows the electronic device 900 that includes a plurality of components such as the processor 901, the controller hub 904, and the memory 902. However, in actual application, a device using the method in this application may include only some of the components of the electronic device 900, for example, may include only the processor 901 and the NIC 903. A property of an optional component in FIG. 7 is shown by using a dashed line.

The memory of the electronic device 900 may include one or more tangible and non-transitory computer-readable media configured to store data and/or instructions. The computer-readable storage medium stores instructions, and specifically, stores temporary and permanent copies of the instructions.

In this application, the electronic device 900 may be specifically a terminal device such as a mobile phone, a tablet computer, a personal digital assistant (Personal Digital Assistant, PDA), a desktop computer, or the like. The instructions stored in the memory of the electronic device may include instructions that enable the electronic device to implement the foregoing mentioned audio play method when the instructions are executed by at least one unit of the processor.

Figure 8:
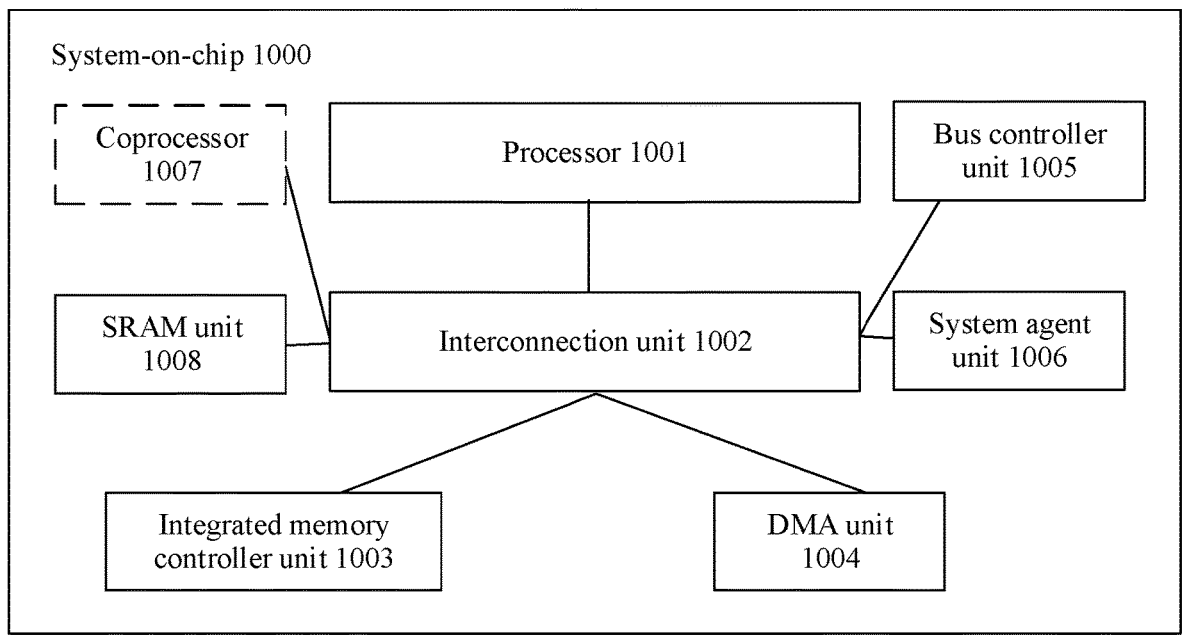
FIG. 8 is a schematic diagram of a structure of a system-on-chip (SoC, system-on-chip) according to some implementations of this application.

For example, FIG. 8 is a schematic diagram of a structure of a SoC (System-on-Chip, system-on-chip) 1000 according to an implementation of this application. In FIG. 8, similar components are represented by a same reference numeral. In addition, a dashed-line box represents an optional feature of a more advanced SoC 1000. The SoC 1000 may be used in any electronic device according to this application, and may implement corresponding functions based on different devices in which the SoC 1000 is located and different instructions stored in the SoC 1000.

In FIG. 8, the SoC 1000 includes: an interconnection unit 1002 that is coupled to a processor 1001; a system agent unit 1006; a bus controller unit 1005; an integrated memory controller unit 1003; one or more coprocessors 1007 that may include integrated graphics logic, an image processor, an audio processor, and a video processor; a static random access memory (Static Random-Access Memory, SRAM) unit 1008; and a direct memory access (Direct Memory Access, DMA) unit 1004. In an embodiment, the coprocessor 1007 includes a dedicated processor, such as a network or communication processor, a compression engine, a GPGPU, a high-throughput MIC processor, an embedded processor, or the like.

The SRAM unit 1008 may include one or more computer-readable media configured to store data and/or instructions. The computer-readable storage medium may store instructions, and specifically, store temporary and permanent copies of the instructions. The instructions may include instructions that enable the electronic device to implement the foregoing mentioned audio play method when the instructions are executed by at least one unit of the processor 1001.

It should be noted that the terms "first", "second", and the like are merely used to distinguish between descriptions, and shall not be understood as an indication or implication of relative importance.

It should be noted that, in the accompanying drawings, some structural or method features may be shown in a particular arrangement and/or order. However, it should be understood that such a particular arrangement and/or order may not be required. In some embodiments, these features may be arranged in a manner and/or order different from that shown in the descriptive accompanying drawings. In addition, inclusion of the structural or method features in a particular figure does not imply that such features are required in all embodiments. In some embodiments, these features may not be included or may be combined with another feature.

Although this application has been illustrated and described with reference to some preferred implementations of this application, a person of ordinary skill in the art should understand that the foregoing content is used to further describe in detail this application with reference to specific implementations, and these descriptions cannot be construed as a limitation on the specific embodiments of this application. A person skilled in the art may make various changes in form and detail, including making several simple deductions or replacements, without departing from the spirit and scope of this application.

What is claimed is:

1. A method, applied to a first electronic device, comprising:

determining first audio data;

determining a text file and metadata of the first audio data by performing content recognition processing on the first audio data;

determining an audio type of the first audio data by performing audio type recognition processing on the first audio data based on the text file and the metadata, wherein the audio type is one of an audio book type or a non-audio book type, wherein the performing the audio type recognition processing comprises:

performing first keyword matching processing on the text file with an audio book recognition database having one or more first preset keywords, wherein the first keyword matching processing generates an automated speech recognition (ASR) text matching element quantity;

performing, separately from the first keyword matching processing performed on the text file, second keyword matching processing on the metadata with the audio book recognition database, wherein the second keyword matching processing generates a metadata matching element quantity;

determining a keyword matching degree based on a sum of the ASR text matching element quantity and the metadata matching element quantity; and determining the audio type of the first audio data based on the keyword matching degree;

determining a sound effect mode corresponding to the audio type, wherein the sound effect mode is determined based on a preset correspondence between the audio type and the sound effect mode; and playing the first audio data based on the sound effect mode.

2. The method according to claim 1, wherein the content recognition processing comprises automatic speech recognition processing, and wherein determining the text file of the first audio data comprises:

obtaining text content corresponding to speech content of the first audio data by performing the automatic speech recognition processing on the first audio data within a preset time period, wherein the text content is used as the text file.

3. The method according to claim 1, wherein the content recognition processing comprises metadata recognition processing, and wherein determining the metadata corresponding to the first audio data comprises:

obtaining the metadata by performing the metadata recognition processing on the first audio data, wherein the metadata comprises at least one type of:

title information of the first audio data, album information of the first audio data, author information of the first audio data, publisher information of the first audio data, genre information of the first audio data, or artist information of the first audio data.

4. The method according to claim 1, wherein:

determining that the audio type of the first audio data is the audio book type in response to the keyword matching degree being greater than or equal to a preset matching degree threshold; or determining that the audio type of the first audio data comprises the non-audio book type in response to the keyword matching degree being less than a matching degree threshold.

5. The method according to claim 4, wherein the determining the keyword matching degree based on the sum of the ASR text matching element quantity and the metadata matching element quantity and the determining the audio type of the first audio data based on the keyword matching degree comprise:

determining that the audio type of the first audio data comprises the audio book in response to the ASR text element matching quantity being greater than or equal to the matching degree threshold; or obtaining, in response to the first keyword matching degree being less than the matching degree threshold, the metadata element matching quantity by performing the second keyword matching processing on the metadata;

determining, in response to the keyword matching degree being greater than or equal to the matching degree threshold, that the audio type of the first audio data comprises the audio book type; and determining, in response to the keyword matching degree and the second keyword matching degree being less than the matching degree threshold, that the audio type of the first audio data comprises the non-audio book type.

6. The method according to claim 4, wherein a sound effect mode corresponding to the audio book comprises a first sound effect mode, and a sound effect mode corresponding to the non-audio book comprises a second sound effect mode.

7. The method according to claim 4, wherein when it is determined that the audio type of the first audio data is the audio book type, the audio type recognition processing further comprises:

determining an audio book subtype of the first audio data based on the matching keyword, and wherein determining the sound effect mode corresponding to the audio type comprises:

determining the sound effect mode corresponding to the audio book subtype, the sound effect mode determined based on a preset correspondence between the audio book subtype and the sound effect mode.

8. The method according to claim 1, wherein the keyword matching degree comprises a quantity of matching keywords.

9. The method according to claim 1, wherein the keyword in the audio book recognition database comprises preset identification information of at least one piece of audio book audio data, and the preset identification information comprises at least one type of:

title information of the audio book audio data, album information of the audio book audio data, author information of the audio book audio data, publisher information of the audio book audio data, genre information of the audio book audio data, artist information of the audio book audio data, or prologue hot word information of the audio book audio data.

10. The method according to claim 1, further comprising:

obtaining the at least one keyword in the audio book recognition database from a cloud server; or sending the matching keyword and the determined audio type to the cloud server.

11. The method according to claim 1, further comprising:

playing second audio data; and determining the first audio data in response to a play instruction of the first audio data being received; or determining the first audio data in response to the first audio data sent by a second electronic device being received.

12. A system, comprising:

a first electronic device; and a second electronic device;

wherein the second electronic device is configured to:

send, to the first electronic device, first audio data, and wherein the first electronic device is configured to:

receive the first audio data; and determine a text file and metadata of the first audio data by performing content recognition processing on the first audio data;

determine an audio type of the first audio data by performing audio type recognition processing on the first audio data based on the text file and the metadata, wherein the audio type is one of an audio book type or a non-audio book type, and wherein the performing the audio type recognition processing comprises:

performing first keyword matching processing on the text file with an audio book recognition database having one or more first preset keywords, wherein the first keyword matching processing generates an automated speech recognition (ASR) text matching element quantity;

performing, separately from the first keyword matching processing performed on the text file, second keyword matching processing on the metadata with the audio book recognition database, wherein the second keyword matching processing generates a metadata matching element quantity;

determining a keyword matching degree based on a sum of the ASR text matching element quantity and the metadata matching element quantity; and determining the audio type of the first audio data based on the keyword matching degree;

determine a sound effect mode corresponding to the audio type, wherein the sound effect mode is determined based on and a preset correspondence between the audio type and the sound effect mode; and play the first audio data based on the sound effect mode.

13. The system according to claim 12, further comprising a cloud server, wherein an audio book recognition database comprising a preset keyword is set in the cloud server, and the cloud server is configured to:

send the preset keyword in the audio book recognition database to the first electronic device, wherein the first electronic device performs the audio type recognition processing based on the preset keyword.

14. An electronic device, comprising:

at least one memory, the at least one memory configured to store at least one computer program, wherein the at least one computer program comprises program instructions; and at least one processor, configured to execute the program instructions, wherein the at least one processor, upon execution of the program instructions, causes the electronic device to:

determine first audio data;

determine a text file and metadata of the first audio data by performing content recognition processing on the first audio data;

determine an audio type of the first audio data by performing audio type recognition processing on the first audio data based on the text file and the metadata, wherein the audio type is one of an audio book type or a non-audio book type, and wherein the performing the audio type recognition processing comprises:

performing first keyword matching processing on the text file with an audio book recognition database having one or more first preset keywords, wherein the first keyword matching processing generates an automated speech recognition (ASR) text matching element quantity;

performing, separately from the first keyword matching processing performed on the text file, second keyword matching processing on the metadata with in the audio book recognition database, wherein the second keyword matching processing generates a metadata matching element quantity;

determining a keyword matching degree based on a sum of the ASR text matching element quantity and the metadata matching element quantity; and determining the audio type of the first audio data based on the keyword matching degree;

determine a sound effect mode corresponding to the audio type, wherein the sound effect mode is determined based on a preset correspondence between the audio type and the sound effect mode; and play the first audio data based on the sound effect mode.

15. The electronic device according to claim 14, wherein the content recognition processing comprises automatic speech recognition processing, and wherein to determine the text file of the first audio data, the electronic device is configured to:

obtain text content corresponding to speech content of the first audio data and use the text content as the text file by performing the automatic speech recognition processing on the first audio data within a preset time period, wherein the text content is used as the text file.

16. The electronic device according to claim 14, wherein the content recognition processing comprises metadata recognition processing, and wherein to determine the metadata corresponding to the first audio data the electronic device is configured to:

obtain the metadata by performing the metadata recognition processing on the first audio data, wherein the metadata comprises at least one type of:

title information of the first audio data, album information of the first audio data, author information of the first audio data, publisher information of the first audio data, genre information of the first audio data, or artist information of the first audio data.

17. The electronic device according to claim 14, wherein:

determine, in response to the keyword matching degree being greater than or equal to a preset matching degree threshold, that the audio type of the first audio data comprises the audio book type;

determining, in response to the keyword matching degree being less than a matching degree threshold, that the audio type of the first audio data comprises the non-audio book type.

18. The electronic device according to claim 17, further caused to:

determine that the audio type of the first audio data comprises the audio book type in response to the ASR text element matching quantity being greater than or equal to the matching degree threshold;

obtain, in response to the ASR text element matching quantity being less than the matching degree threshold, the metadata element matching quantity by performing the second keyword matching processing on the metadata.

* * * * *